US012690103B2

(12) United States Patent
Theunissen

(10) Patent No.: US 12,690,103 B2

(45) Date of Patent: Jul. 21, 2026

(54) AUTO-TRANSITION POWER BOOST MODE LIGHT

(71) Applicant: Banner Engineering Corp., Minneapolis, MN (US)

(72) Inventor: William Theunissen, Minneapolis, MN (US)

(73) Assignee: Banner Engineering Corp., Minneapolis, MN (US)

( * ) Notice: Subject to any disclaimer, the term of this patent is extended or adjusted under 35 U.S.C. 154(b) by 0 days.

(21) Appl. No.: 19/121,377

(22) PCT Filed: Nov. 8, 2023

(86) PCT No.: PCT/US2023/079154

§ 371 (c)(1),
(2) Date: Apr. 15, 2025

(87) PCT Pub. No.: WO2024/102857

PCT Pub. Date: May 16, 2024

(65) Prior Publication Data

US 2026/0113822 A1 Apr. 23, 2026

Related U.S. Application Data

(60) Provisional application No. 63/383,422, filed on Nov. 11, 2022.

(51) Int. Cl.
*H05B 45/32* (2020.01)
*H05B 45/44* (2020.01)

(52) U.S. Cl.
CPC ............. *H05B 45/32* (2020.01); *H05B 45/44* (2020.01)

(58) Field of Classification Search
CPC ......... H05B 45/32; H05B 45/44; H05B 45/25
See application file for complete search history.

(56) References Cited

U.S. PATENT DOCUMENTS 6,232,724 B1 5/2001 Onimoto et al.
8,643,305 B2 * 2/2014 Lebens .................. H05B 45/20 315/307

(Continued)

FOREIGN PATENT DOCUMENTS

CN 103298201 A * 9/2013 ............. H05B 45/32
CN 102498449 B * 6/2014 ............. H05B 45/48

(Continued)

OTHER PUBLICATIONS

Advanced Energy, Using the Ultimod To Charge Capacitors for Laser Driving Applications Report, Feb. 6, 2017, 11 pages.

(Continued)

*Primary Examiner* — Abdullah A Riyami
*Assistant Examiner* — Syed M Kaiser
(74) *Attorney, Agent, or Firm* — Thompson Patent Law Offices PC

(57) ABSTRACT

Apparatus and associated methods relate to a dual mode power regulation system (DMPRS) having an energy storage device configured to store energy from a power supply. In an illustrative example, a DMPRS may include a passive mode switching circuit (PMSC). The PMSC, for example, may regulate a current output from the energy storage device to a passive electric load (PEL). For example, in a high power mode, the PMSC regulates the current output to be greater than a power rating of the power supply. When the energy stored in the energy storage device is dissipated, for example, the PMSC may passively and automatically transition to a steady-state mode. For example, in the steady-state mode, the output power may be maintained above a minimum operating current such that the PEL may operate normally. Various embodiments may advantageously provide an energy pulse higher than the power rating to the PEL.

20 Claims, 12 Drawing Sheets

(56) References Cited

U.S. PATENT DOCUMENTS

| | | | | |
|---|---|---|---|---|
| 8,704,450 | B2 | 4/2014 | Chen et al. | |
| 10,067,069 | B2 | 9/2018 | Pinter | |
| 11,328,380 | B2 | 5/2022 | Pinter et al. | |
| 2010/0052936 | A1 | 3/2010 | Curran et al. | |
| 2012/0104962 | A1 | 5/2012 | Chen et al. | |
| 2014/0125237 | A1 | 5/2014 | Van Erp | |
| 2015/0196239 | A1* | 7/2015 | Meehan | A61B 5/02416 600/323 |
| 2017/0373590 | A1 | 12/2017 | Adest et al. | |
| 2020/0134773 | A1 | 4/2020 | Pinter et al. | |
| 2020/0267815 | A1* | 8/2020 | Rothschild | H05B 45/325 |
| 2021/0063897 | A1 | 3/2021 | Gladnick et al. | |
| 2021/0299879 | A1 | 9/2021 | Pinter et al. | |
| 2022/0174883 | A1* | 6/2022 | Adams | H05B 45/46 |

FOREIGN PATENT DOCUMENTS

| | | | |
|---|---|---|---|
| CN | 112671069 | B | 4/2021 |
| CN | 112838624 | A | 5/2021 |
| WO | 2019099455 | A1 | 5/2019 |
| WO | 2022159539 | A1 | 7/2022 |
| WO | 2024102857 | A1 | 5/2024 |

OTHER PUBLICATIONS

Banner Engineering, Ring Lights, accessed Oct. 22, 2022, www.bannerengineering.com/be/en/products/part.97378.html.

Hackaday.Io, A Super Capacitor Pulsed Power 24V DC Supply, accessed Oct. 20, 2022, www.hackaday.io/ project/15327-a-super-capacitor-pulsed-power-24v-dc-supply.

International Search Report and Written Opinion of the International Searching Authority in related International Application No. PCT/US2023/079154, dated Feb. 29, 2024, 9 pages.

New Source Technology, Capacitor Charging Power Supplies, accessed Oct. 20, 2022, www.newsourcetechnology.com/capacitor-chargers/.

* cited by examiner

AUTO-TRANSITION POWER BOOST MODE LIGHT

CROSS-REFERENCE TO RELATED APPLICATIONS

This application is a national stage application under 35 U.S.C. 371 of and claims the benefit of PCTUS2023/079154, titled Auto-Transition Power Boost Mode Light," filed by William Theunissen on Nov. 8, 2023 which U.S. Provisional Application Ser. No. 63/383,422, titled "Auto-Transition Power Boost Mode Light," filed by William Theunissen, on Nov. 11, 2022.

This application incorporates the entire contents of the foregoing application(s) herein by reference.

The subject matter of this application may have common inventorship with and/or may be related to the subject matter of the following:

- PCT Application Serial No. PCT/US2023/075143, titled "Reconfigurable Detection Windows with Dynamically Activated Detection Arrays," filed by Charles Dolezalek, et al., on Sep. 26, 2023.
- PCT Application Serial No. PCT/US2022/078548, titled "Distributed Communication and Control System Using Concurrent Multi-Channel Master Unit," filed by Robert T. Fayfield, et al., on Oct. 21, 2022.
- U.S. application Ser. No. 17/823,312, titled "Field Installable Light Curtain Side Status Module," filed by Nick Olsen, et al., on Aug. 30, 2022.
- PCT Application Serial No. PCT/US2022/075677, titled "Field Installable Light Curtain Side Status Module," filed by Nick Olsen, et al., on Aug. 30, 2022.
- U.S. application Ser. No. 17/823,361, titled "Self-Contained Range Detection Systems with Reconfigurable Chatter-Mitigated Output Indication," filed by Chunmei Kang, et al., on Aug. 30, 2022.
- PCT Application Serial No. PCT/US2022/075689, titled "Self-Contained Range Detection Systems with Reconfigurable Chatter-Mitigated Output Indication," filed by Chunmei Kang, et al., on Aug. 30, 2022.
- U.S. application Ser. No. 15/458,705, titled "Dual Input Voltage Constant Power Indicator," filed by William Theunissen, et al., on Mar. 14, 2017, issued as U.S. Pat. No. 10,405,407 on Aug. 7, 2018.
- U.S. application Ser. No. 15/222,429, titled "Omni-Directional In-Line Illumination Indicator Device," filed by Charles Dolezalek, et al., on Jul. 28, 2016, issued as U.S. Pat. No. 10,347,092 on Jul. 9, 2019.

This application incorporates the entire contents of the foregoing application(s) herein by reference.

TECHNICAL FIELD

Various embodiments relate generally to methods and apparatus for passive and automatic power regulation.

BACKGROUND

Machine vision, sometimes also known as computer vision, is an application of artificial intelligence and computer science to enable machines, particularly computers, to interpret and understand visual information. For example, machine vision may involve algorithms, software, and hardware systems to extract meaningful insights and to make decisions based on images and videos.

For example, a system may use machine vision algorithms and may be configured to interpret and/or react to visual data processed by the machine vision algorithms. Machine vision algorithms and systems may be used in numerous domains, including manufacturing, healthcare, autonomous vehicles, security, agriculture, etc. By leveraging cameras and sensors, for example, machine vision systems may capture and analyze images to perform tasks including object recognition, motion tracking, quality control, and scene understanding.

A machine vision system may include image sensors (e.g., CCD and CMOS sensors, optical cameras), processing units (e.g., CPUs and GPUs), and a memory device sorting machine vision algorithms for extraction of relevant information from images and videos captured by the image sensors. For example, the machine vision algorithms may include image filtering, feature extraction, pattern recognition, and deep learning. In some examples, artificial intelligence may be used. For example, deep neural networks (e.g., convolutional neural networks (CNNs)) may be used in advancing machine vision capabilities to improve accuracy in performing "smart" tasks including image classification and object detection.

Lighting plays a crucial role in machine vision systems. For example, lighting may significantly affect an effectiveness and performance of the machine vision systems. Proper illumination, for example, may be essential for capturing high-quality images and videos that are essential for accurate interpretation and analysis. In machine vision applications, lighting, for example, may be designed to enhance contrast, reduce shadows, and/or highlight specific features of objects within a field of view. Various lighting techniques (e.g., uniform lighting, directional lighting, and strobe lighting) may be employed to ensure optimal visibility and clarity of visual data. In some examples, inadequate and/or inappropriate lighting may lead to challenges in image processing.

SUMMARY

Apparatus and associated methods relate to a dual mode power regulation system (DMPRS) having an energy storage device configured to store energy from a power supply. In an illustrative example, a DMPRS may include a passive mode switching circuit (PMSC). The PMSC, for example, may regulate a current output from the energy storage device to a passive electric load (PEL). For example, in a high-power mode, the PMSC regulates the current output to be greater than a power rating of the power supply. When the energy stored in the energy storage device is dissipated, for example, the PMSC may passively and automatically transition to a steady-state mode. For example, in the steady-state mode, the output power may be maintained above a minimum operating current such that the PEL may operate normally. Various embodiments may advantageously provide an energy pulse higher than the power rating to the PEL.

Apparatus and associated methods relate to a selective pulse light emitting diode system (SPLEDS) configured to provide high intensity light in a machine vision system (MVS). In an illustrative example, the SPLEDS may be coupled to a standard power supply configured to charge an energy storage device (ESD) in a nominal current. The ESD, during a high-power mode, may discharge an LED current higher than the nominal current to an LED module. The LED module may, for example, emit a high intensity light for the MVS to advantageously capture images without motion blur. In the high power mode, for example, the SPLEDS may include an LED regulator circuit to maintain a same current through the LED module to maintain a steady light output. Various embodiments may advantageously reduce a power requirement for the SPLEDS to reduce space requirements and risks of safety hazards for the SPLEDS.

Various embodiments may achieve one or more advantages. For example, some embodiments may advantageously protect overcurrent of the power supply. Some embodiments, for example, may advantageously provide a stun light for military personnel. For example, some embodiments may advantageously provide fast charging of the energy storage device. Some embodiments may, for example, advantageously switch linearly to operate in a steady-state mode using the nominal current to emit a dimmer light. For example, some embodiments may advantageously provide a pulse light for high resolution image capture for machine vision processing.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, an adjustable light machine vision system (ALMVS) is introduced with reference to FIGS. 1-2. Second, that introduction leads into a description with reference to FIGS. 3A-3E of some exemplary embodiments of a selective pulse light emitting diode system. Third, with reference to FIG. 4, a charging and recharging cycle is described in application to the selective pulse light emitting diode system. Fourth, with reference to FIGS. 5A-C, the discussion turns to exemplary embodiments that illustrate various exemplary placements of energy storage devices in the selective pulse light emitting diode system. Fifth, and with reference to FIGS. 6-7, this document describes exemplary apparatus and methods useful for designing and operating the selective pulse light emitting diode system. Finally, the document discusses further embodiments, exemplary applications and aspects relating to the selective pulse light emitting diode system.

Figure 1:
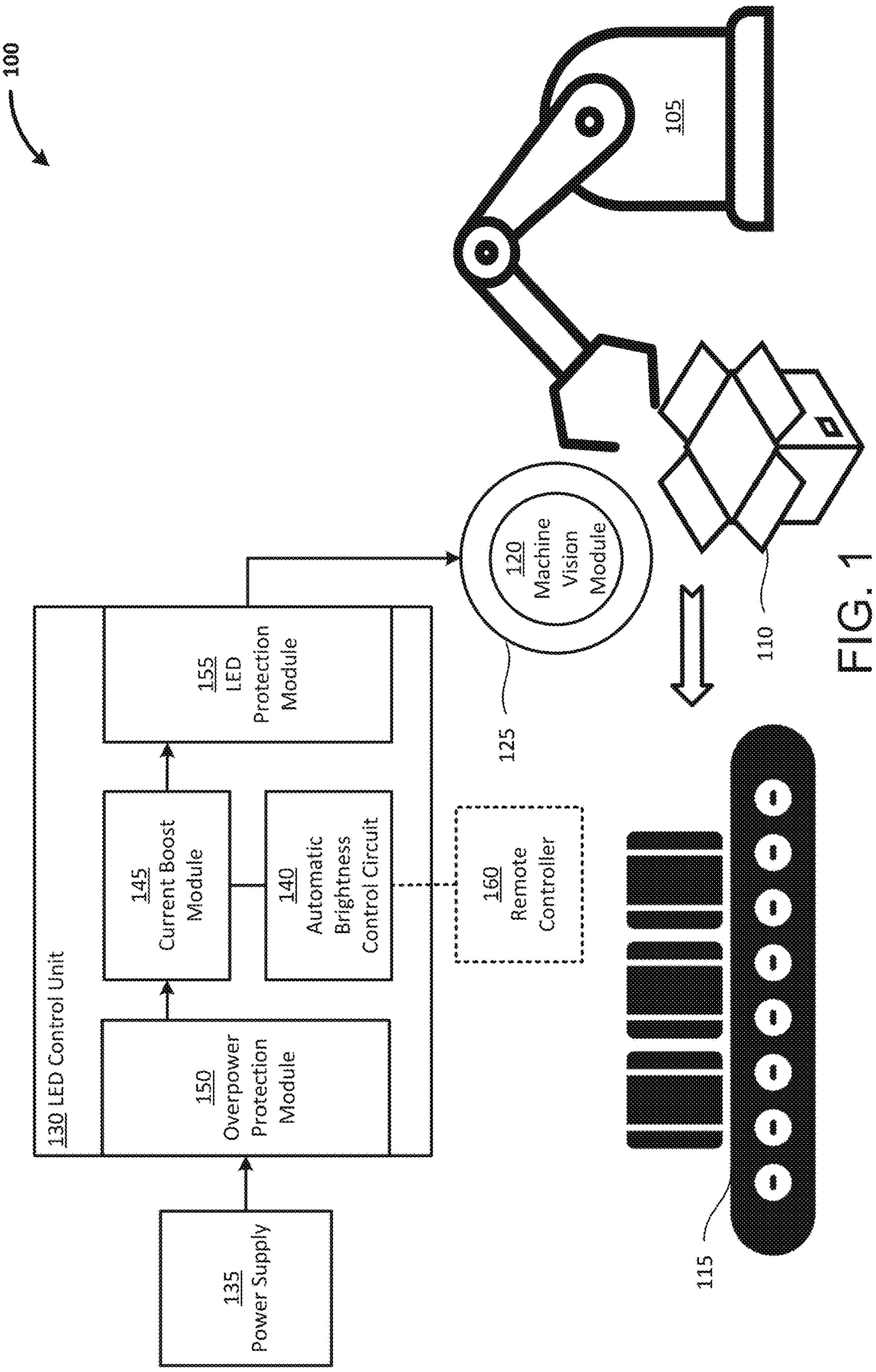
FIG. 1 depicts an exemplary adjustable light machine vision system (ALMVS) employed in an illustrative use-case scenario.

FIG. 1 depicts an exemplary adjustable light machine vision system (ALMVS 100) employed in an illustrative use-case scenario. As an illustrative example, the ALMVS 100 may be used in an automatic pick and transfer application. For example, the automatic pick and transfer application may include controlling a robotic arm based on one or more images captured by a machine vision module (e.g., a camera and a machine vision processing engine). In this example, the ALMVS 100 includes a robot 105 configured to retrieve items from a container 110. The robot 105, for example, may place the retrieved items on a conveyor belt 115.

As shown, the ALMVS 100 includes a machine vision module (MVM 120). In some implementations, the MVM 120 may include a camera. For example, the camera may be configured to capture images from the container 110. For example, the MVM 120 may include an image processing engine to process one or more images captured from the container. Based on the processing result, for example, the MVM 120 may identify and/or locate an item to be retrieved from the container 110.

In some examples, the MVM 120 may require, from time-to-time, large pulses of light to capture higher quality images for image processing. In this example, the ALMVS 100 includes a light emitting diode module (LED module 125) and an LED control unit (LCU 130). The LED module 125 is configured to supply light for the MVM 120. In some examples, a high intensity light may be required to capture sharp images. For example, the LCU 130 may advantageously reduce image processing time of the MVM 120 by supplying a high intensity light to capture sharp and high-resolution images.

In some implementations, the MVM 120 and the LED module 125 may be coordinately controlled by an artificial intelligent (AI) module. For example, the AI module may use the MVM 120 to look at the container 110 to determine an overall size and shape of an item (e.g., a package, a product). In some implementations, the AI module may determine how the robot 105 may retrieve the item (e.g., by determine a pick up route to reach the item, by a determined pick-up force, by a suction force).

In some examples, the ALMVS 100 may require a high intensity (e.g., bright) pulse light to reduce motion blur because the robot 105 and/or the conveyor belt 115 may be moving. For example, the MVM 120 may require the high intensity pulse light when the robot 105 is moving because very few photons may be received by the camera, causing the captured images to be darker. For example, the low light images may include motion blur. To eliminate and/or reduce motion blur, for example, the LED module 125 may be required to supply a high intensity light for a short period of time for image capturing by the MVM 120. In various implementations, the LED module 125 may be configured to supply a very bright pulse light (e.g., over 300 W of LED light) to advantageously reduce motion blur in images captured by the MVM 120.

In this example, the LCU 130 is coupled to a power supply 135. For example, the power supply 135 may include a power rating specifying a safe power limit of the power supply 135. For example, the power supply 135 may be a standard power supply (e.g., a class 2 power supply such as defined by Underwriters Laboratory UL1310 standard section 28, a limited power supply such as defined by the International Electric Code IEC62368-1 standard). For example, the power supply 135 may be required to at least include a power rating higher than an average power consumption of the LED module 125.

As an illustrative example, the power supply 135 may, by way of example and not limitation, supply up to 100 W of power. For example, the power supply 135 may be sufficient when an average power requirement from the LED module 125 is below 100 W. However, for example, when a high intensity pulse light is required by the LCU 130, the LED module 125 may require a power higher than the power rating of the power supply 135. As an illustrative example without limitation, in the ALMVS 100, the LED module 125 may require 30 W 90% of the time and 300 W (to the very bright pulse light) 10% of the time. The power requirement, for example, may be only 30 W. In some applications (e.g., in machine vision application to identifying pallet of objects moving on a conveyor belt), the ALMVS 100 may be off 90% of the time (e.g., requiring OW of power at the LED module), and a high intensity off power (e.g., 300 W) 10% of the time.

In various implementations, using a standard power supply may advantageously reduce additional wiring and safety features (e.g., special AC circuit breakers designed for higher power devices) that are required for using a high-power supply (e.g., a class 1 power supply). In various examples, higher power supply may be bigger in size. Accordingly, using a standard power supply may advantageously reduce space required to install the power supply 135 at a work plant.

The LCU 130 receives power from the power supply 135 and supplies a regulated power to the LED module 125.

As shown, the LCU 130 includes an automatic brightness control circuit (ABCC 140). For example, the ABCC 140 may (optionally) be operably coupled to a remote controller 160 to regulate power supplied to the LED module 125. For example, the ABCC 140 may receive a signal to increase light intensity from the remote controller 160. For example, the remote controller 160 may be connected to the ABCC 140 wirelessly. For example, the remote controller 160 may be connected to the ABCC 140 via a data cable.

The ABCC 140 is operably coupled to a current boost module 145. For example, the current boost module 145 may include one or more energy storage device(s). The current boost module 145 may, for example, receive a first maximum input power. The current boost module 145 may, for example, output a second maximum output power greater than the first maximum input power.

As shown, the current boost module 145 receives power from the power supply 135 via an overpower protection module 150. For example, the current boost module 145 may include electronic devices for storing electrical power. In some implementations, the current boost module 145 may include electronics configured for rapid energy storage. For example, the current boost module 145 may include super capacitors. For example, the energy storage device(s) of the current boost module 145 may include batteries.

In some implementations, the current boost module 145 may be configured to store electric charge supplied from the power supply 135. For example, the current boost module 145 may store enough energy to be discharged to the LED module 125 for a predetermined maximum discharge duration (e.g., 2.5 ms, 3 ms, 3.5 ms, 5 ms). The LED module 125, for example, may be operated to emit high intensity light when the current boost module 145 is discharging to the LED module 125. In some implementations, the predetermined maximum discharge duration may be determined by an energy storage capacity (e.g., a capacitance, a battery capacity) of the current boost module 145.

In some implementations, after the electric charges are dissipated from the current boost module 145, the LCU 130 may, for example, supply power to the MVM 120 directly from the power supply 135 at nominal power of the power supply 135. For example, the current boost module 145 may be operating in a "by-pass" mode that allows the current from the power supply 135 to flow to the LED module 125. In this case, for example, the LED module 125 may be operated with a lower intensity.

The LCU 130 also includes an overpower protection module 150 and a LED protection module 155. In some implementations, the overpower protection module 150 may include a circuit to limit current drawn from the power supply 135. For example, the overpower protection module 150 may protect the power supply 135 from supplying excessive current. For example, the overpower protection module 150 may limit the power supply 135 to only draw a predetermined power (e.g., 25 W, 50 W, 75 W, 80 W) and/or current (e.g., 100 mA, 1.5 A, 3.6 A) at a peak charge rate. In some implementations, the LED protection module 155 may include a circuit to limit current flow to the LED module 125. For example, the LED protection module 155 may protect the LED module 125 from being damaged by an excessive current supplied from the LCU 130.

In various implementations, the LCU 130 may operate the LED module 125 in a steady-state mode and a high-power mode using the ABCC 140. In the high-power mode, the ABCC 140 may, for example, discharge electric charges from the current boost module 145 to the LED module 125. The LED module 125 may, after receiving the discharged energy, emit a high intensity light to advantageously aid an image processing of the MVM 120, for example. In some implementations, after the electric charges are discharged from the current boost module 145 (e.g., the output voltage of the ABCC 140 may be less than a predetermined threshold), the LCU 130 may passively and automatically transition to the steady-state mode to supply a nominal power to the LED module 125. For example, the LCU 130 may transit to the steady-state mode without changing a power demand at the LED module 125. For example, by switching to the steady-state mode, the LCU 130 may advantageously protect the power supply 135 from overcurrent. In the steady-state mode, in some implementations, the LED module 125 may continue to emit a dimmer light based on a lower power (e.g., reduced current). For example, the LED module 125 may include a minimum operating current lower than a peak discharge current in the high-power mode. Various embodiments may advantageously allow a standard power supply to be used to generate high light intensity light for an image capture operation of machine vision processing.

Figure 2:
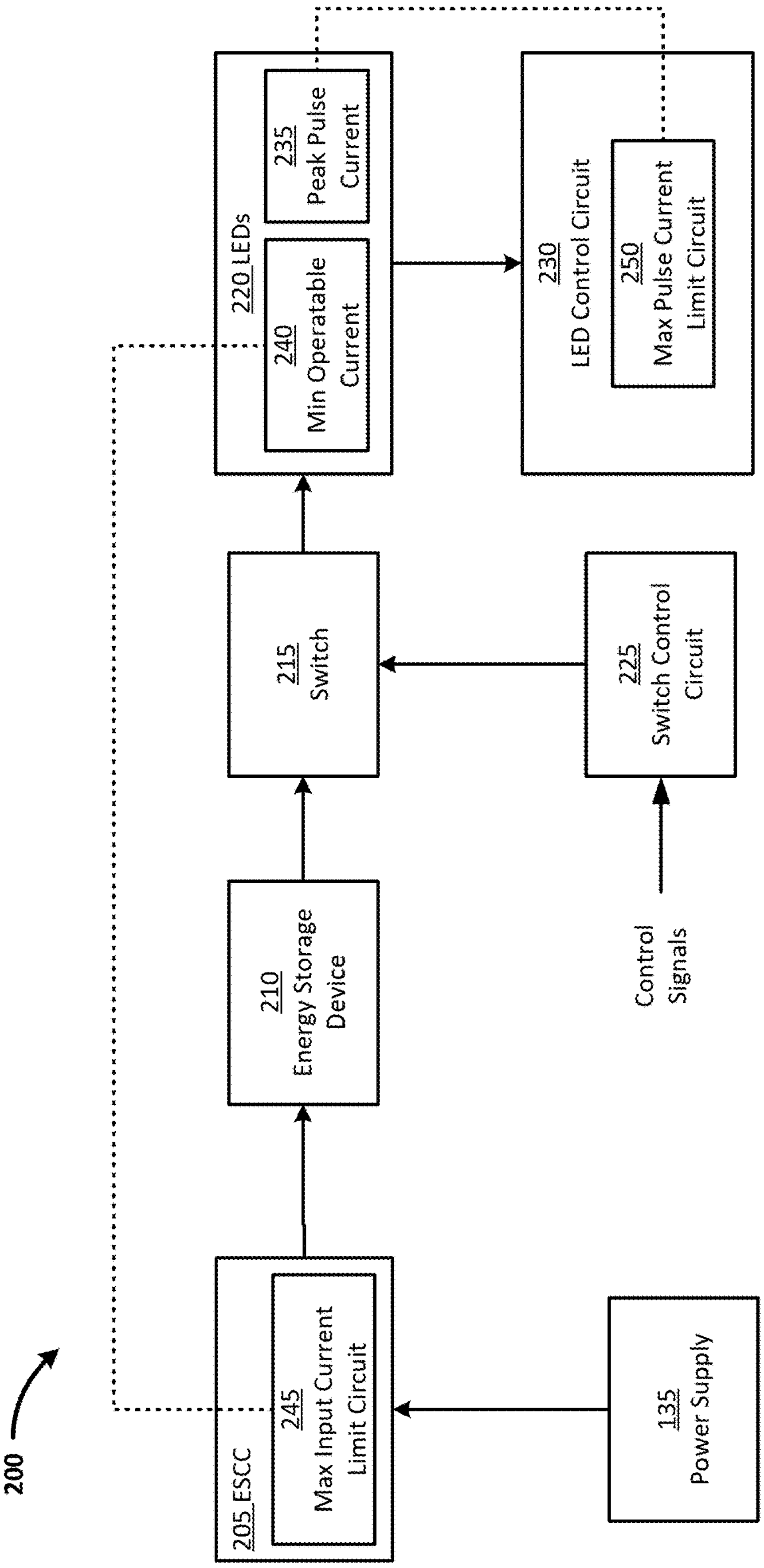
FIG. 2 is a block diagram depicting an exemplary selective pulse light emitting diode system (SPLEDS).

FIG. 2 is a block diagram depicting an exemplary selective pulse light emitting diode system (SPLEDS 200). For example, the SPLEDS 200 may be used in the ALMVS 100. For example, the SPLEDS 200 may include the LCU 130. In this example, the SPLEDS 200 includes an energy storage charge circuit (ESCC 205), an energy storage device 210, a switch 215, and LED(s) 220.

By way of example and not limitation, the ESCC 205 may be implemented as the overpower protection module 150. In some implementations, the ESCC 205 may control charging of the energy storage device 210. For example, the ESCC 205 may control current flowing into the energy storage device 210. In some implementations, the ESCC 205 may regulate the current flow into the energy storage device 210. For example, the ESCC 205 may also set a maximum current flow to the SPLEDS 200 and to the LED(s) 220. In some implementations, as the energy storage device 210 is being discharged, the ESCC 205 may also allow current to flow to the LED(s) 220 when the energy storage device 210 is out of charge.

By way of example and not limitation, the energy storage device 210 may be implemented as the current boost module 145. The energy storage device 210 may, for example, include an electromechanical energy storage device. In some implementations, for example, the energy storage device 210 may include one or more capacitors. In some examples, the energy storage device 210 may include one or more super-capacitors. By way of example and not limitation, the energy storage device 210 may include one or more batteries. In some implementations, the energy storage device 210 may be selected based on a determined pulse width, a determined pulse amplitude, and/or a determined pulse frequency of a power required in the high-power mode as described with reference to FIG. 1, for example.

The switch 215 and/or the switch control circuit 225 may, for example, be implemented as the ABCC 140. The switch 215, in this example, is controlled by a switch control circuit 225. For example, the switch 215 and the switch control circuit 225 may connect and disconnect the energy storage device 210 and the LED(s) 220. In some implementations, the switch control circuit 225 may receive (external) control signals (e.g., from the remote controller 160) of the light to turn on and off the switch 215. For example, the control signals may be received independent of a present operation mode (e.g., the high-power mode, steady-state mode, charging/deactivated mode) of the LED(s) 220.

The SPLEDS 200 further includes a LED control circuit 230. In some implementations, by way of example and not limitation, the LED control circuit 230 may be implemented as a LED protection module 155. The LED control circuit 230 may, for example, set a current flow to the LED(s) 220 by controlling a discharge rate from the energy storage device 210. In some implementations, the LED control circuit 230 may permit a higher current draw from the energy storage device 210 than the current limit set by the ESCC 205.

As an illustrative example, the LED(s) 220 may be selected to operate with a predetermined peak pulse current 235 and a predetermined minimum operable current 240 from the SPLEDS 200. For example, the predetermined peak pulse current 235 may include an operation rating with a maximum current without damaging the LED(s) 220.

In some implementations, the LED control circuit 230 may be configured to regulate a current flowing from the energy storage device 210 to the LED(s) 220 is less than the maximum current. For example, the predetermined minimum operable current 240 may include a minimum current required for the LED(s) 220 to emit light. For example, the LED(s) 220 may generate a light with intensity (e.g., directly, indirectly, linearly, non-linearly) proportional to a current received.

As shown the ESCC 205 includes a maximum input current limit circuit (MICLC 245) related to the predetermined minimum operable current 240. In some implementations, based on the predetermined minimum operable current 240, an electrical engineer may design the MICLC 245 to regulate an input current to be flow to the LED(s) 220 via the energy storage device 210. For example, the MICLC 245 may include a transistor circuit configured to allow an input current to flow to the LEDs 220 to keep the LED(s) 220 operating when the energy storage device 210 is depleted.

The LED control circuit 230 includes, in this example, a maximum pulse current limit circuit (MPCLC 250) related to the predetermined peak pulse current 235. In some implementations, an electrical engineer may design the MPCLC 250 to regulate the pulse current flow through the LED(s) 220 in the high intensity mode. For example, the MLCLC 245 may include a transistor circuit configured to draw a larger current than the MICLC 245 of the ESCC 205 permits.

As an illustrative example without limitation, in operation, a current may flow into the SPLEDS 200 (e.g., from the power supply 135) to charge the energy storage device 210 when the switch 215 disconnects the LED(s) 220. For example, a charge current may be set in the ESCC 205 within a current limit to advantageously prevent an external power supply (e.g., the power supply 135) from being damaged (e.g., in short circuit mode). In various implementations, the ESCC 205 may advantageously allow a user to select a power supply based on the current limit set by the ESCC 205 instead of a maximum LED current required for the high intensity pulse light (e.g., the predetermined peak pulse current 235 of the LED(s) 220). In a fully charged mode, for example, when the energy storage device 210 is fully charged, the SPLEDS 200 may not draw further current from the external power supply.

When the switch 215 is on, for example, a LED current may flow out of the energy storage device 210 and into the LED(s) 220 and the LED control circuit 230. In the high-power mode, for example, the LED control circuit 230 may draw a high current to the LED(s) 220 from the energy storage device 210. However, the LED control circuit 230 may, for example, also limit the LED current to be less than the predetermined peak pulse current 235 to prevent the LED(s) 220 from being overloaded by an excessive current. In some implementations, the LED current limit may be a predetermined multiple (e.g., 3, 5, 8, 10, over 10 times) higher than a maximum current to be supplied by the external power supply (e.g., as determined by a power rating of the power supply). Accordingly, the SPLEDS 200 may, for example, advantageously allow use of an external power supply with a lower rating than a required current for the high-power mode. For example, using an external power supply with a lower power rating may save costs and space in manufacturing and/or operating the SPLEDS 200 and/or the ALMVS 100.

In some implementations, the LED control circuit 230 may be further configured to advantageously regulate a current flow from the energy storage device 210 to the LED(s) 220 during a discharge process in the high-power mode (e.g., when charges stored in capacitors of the energy storage device 210 is being discharged). Accordingly, the LED control circuit 230 may advantageously maintain a same current through the LED(s) 220 to maintain a steady light output from the LED(s) 220 in the high-power mode for a predetermined (e.g., short) period of time based on a predetermined pulse width of the SPLEDS 200.

As an illustrative example, when current is flowing from the energy storage device 210 to the LED(s) 220, the charge current may continue to flow from the external power supply to the SPLEDS 200. For example, the charge current may try to recharge the energy storage device 210. Since the LED current is set much higher than the charge current, eventually the energy storage device 210 may be drained so that the LED current may not be maintained. For example, an output voltage of the energy storage device 210 may be less than a predetermined threshold. At this point, for example, the ESCC 205 may limit the charge current through the LED(s) 220 to match that of the normal charge current.

In various implementations, the SPLEDS 200 may be configured to automatically switch to the steady-state mode continuously independent of the external control signal. In various examples, a LED light intensity may be nearly linearly proportional to the LED current. For example, the LED light output of the LED(s) 220 may be dimmer in the steady-state mode than in the high-power mode.

In various implementations, a power regulation circuit (e.g., the SPLEDS 200) may include a power supply (e.g., the power supply 135) and an energy storage charge circuit (e.g., the ESCC 205) connected to the power supply. For example, the power regulation circuit may be configured to supply an output power to a passive electric load (e.g., the LED module 125, the LED(s) 220) in two stages. In a first stage, for example, the output power may be higher than a power rating of the power supply. In a second stage, for example, the output power may be less than or equal to the power rating. In some implementations, the first stage transitions passively and automatically to the second stage when a power output of the energy storage charge circuit is less than a predetermined power.

Figure 3A:
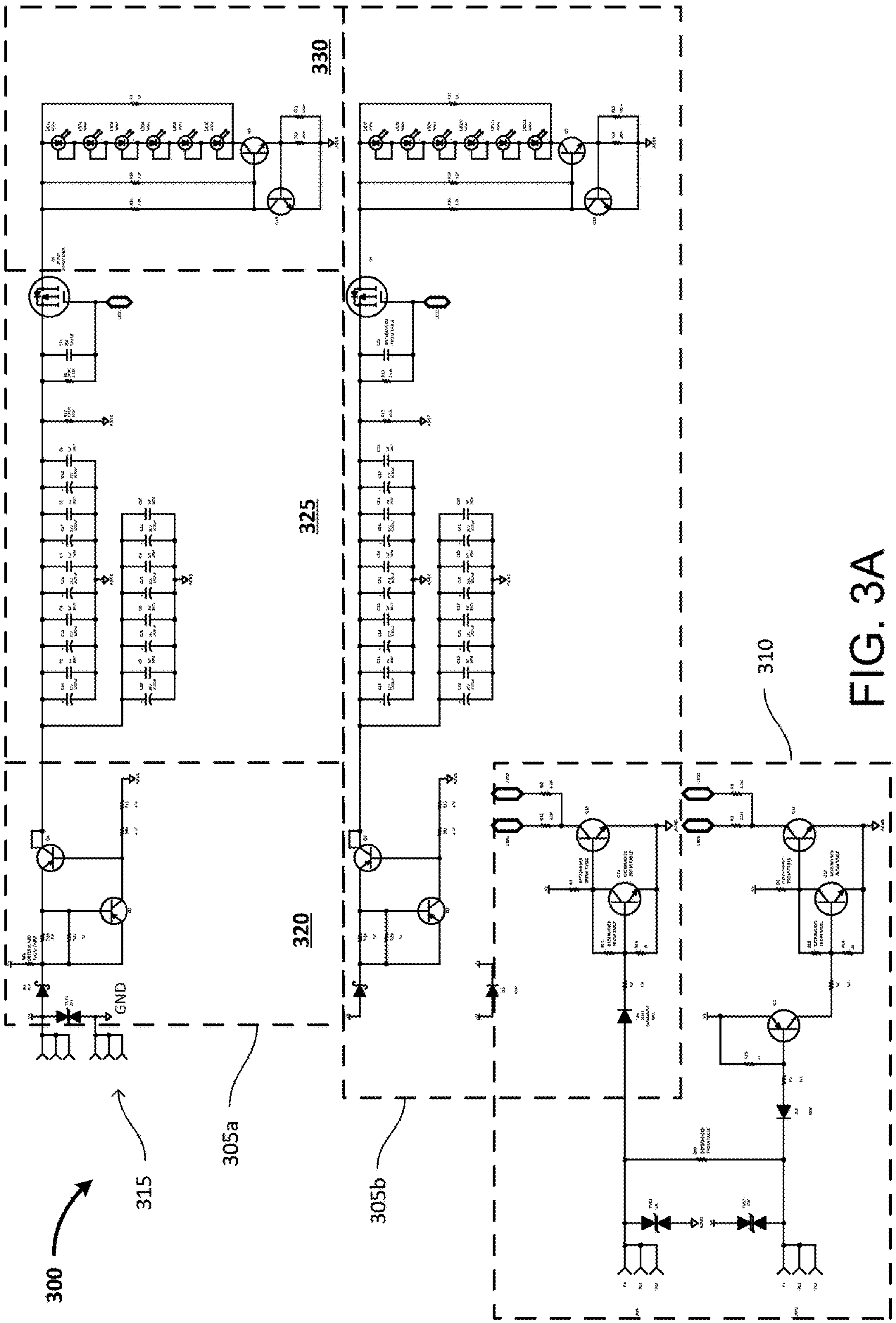
FIG. 3A, FIG. 3B, FIG. 3C, FIG. 3D, and FIG. 3E depict exemplary electrical schematics of an exemplary SPLEDS.

FIG. 3A, FIG. 3B, FIG. 3C, FIG. 3D, and FIG. 3E depict exemplary electrical schematics of an exemplary selective pulse light emitting diode system (SPLEDS 300). For example, the SPLEDS 300 may be an implementation of the SPLEDS 200. As shown in FIG. 3A, the SPLEDS 300 includes a first light emitting circuit 305*a* and a second light emitting circuit 305*b*, and a controller circuit 310. The two light emitting circuits 305*a*, 305*b* may be coupled to a power supply input module 315. For example, the two light emitting circuits 305*a*, 305*b* may include an identical design. The first light emitting circuit 305*a*, as shown, includes an ESCC 320, an energy storage device and switch circuit 325, and a LED module and LED control circuit 330.

The ESCC 320 are described below with reference to FIG. 3B. The energy storage device and switch circuit 325 are described with reference to FIG. 3C. The LED module and LED control circuit 330 is described with reference to FIG. 3D. The controller circuit 310 is described with reference to FIG. 3E.

Figure 3B:
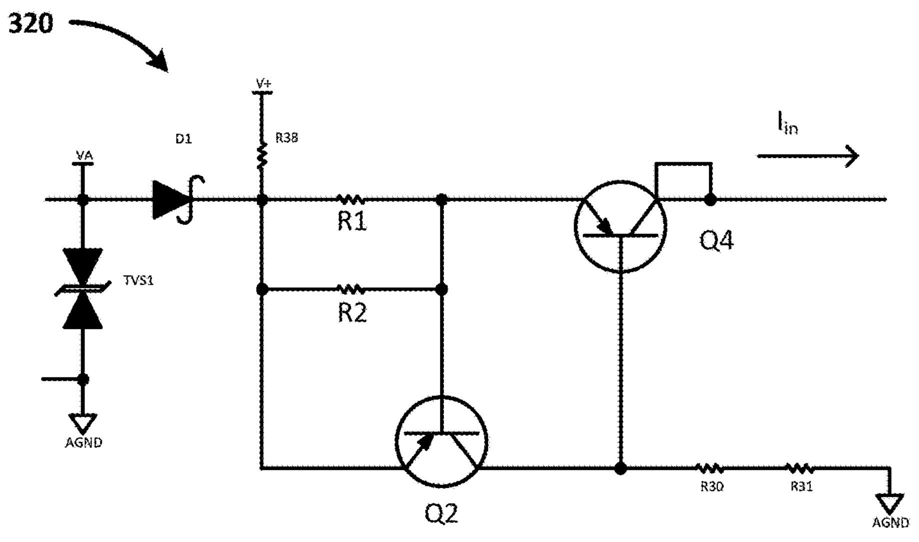

As shown in FIG. 3B, the ESCC 320 may limit an input charge current $I_{in}$ flowing from an external power supply to the energy storage device and switch circuit 325. For example, $I_{in}$ may be defined by a voltage between the base and emitter of a transistor Q2 (e.g., a PNP transistor) divided by the effective resistance of the parallel resistors R1 and R2. For example, the ESCC 320 may advantageously set the input charge current $I_{in}$ without short circuiting the external power supply of the SPLEDS 300.

Figure 3C:
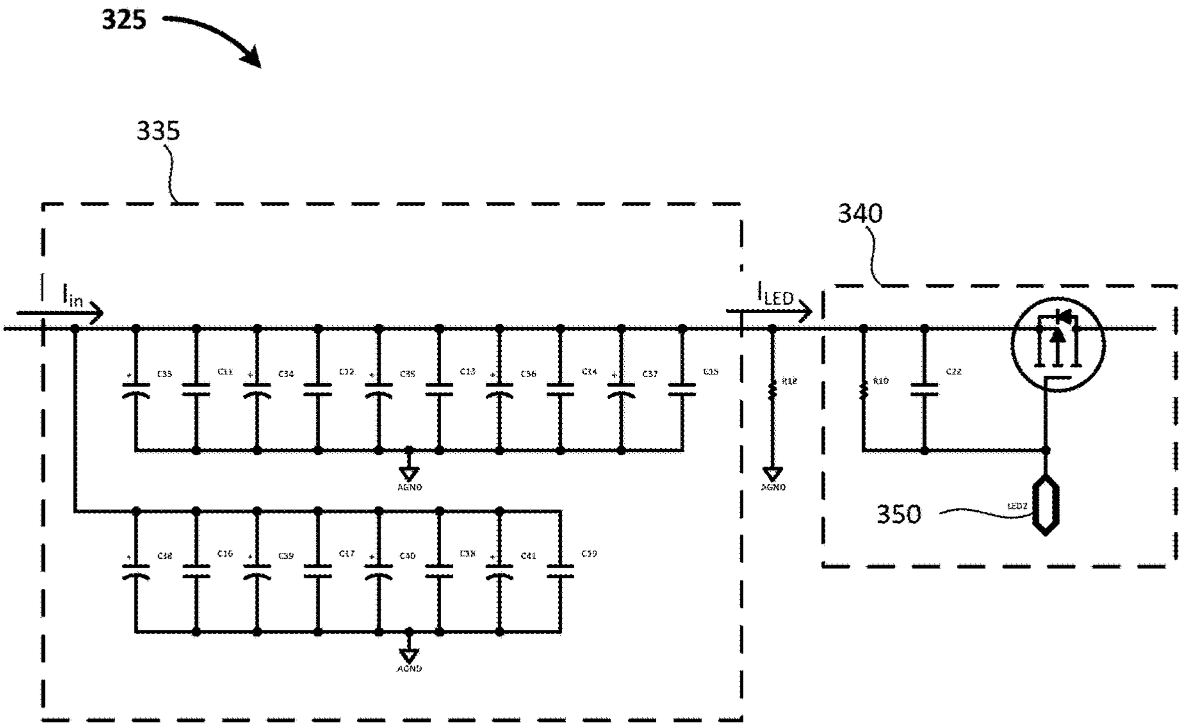

As shown in FIG. 3C, the input charge current $I_{in}$ flows into an energy storage device 335. In this example, the energy storage device 335 includes a capacitor bank (e.g., 10, 18, 36, 100) of capacitors (e.g., of 1000 μF) connected in parallel. In this example, the energy storage device 335 may include approximately 9009 μF of capacitance. For example, the capacitor bank may advantageously be configured to charge rapidly.

Figure 3D:
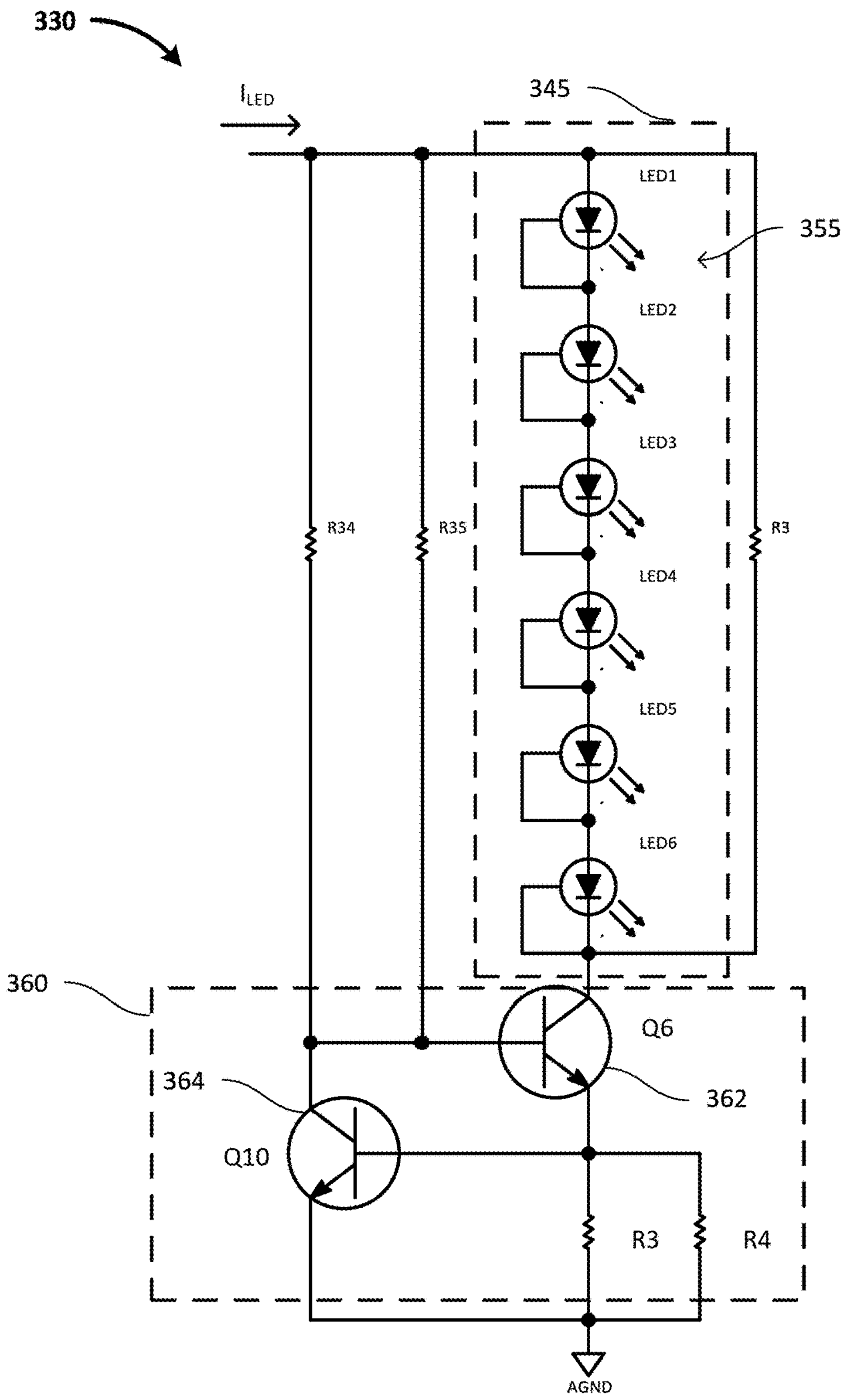

In this example, the energy storage device 335 may accumulate electric charges in the capacitor bank when a switch circuit 340 disconnects the energy storage device 335 from a LED module 345 (shown in FIG. 3D). When the switch circuit 340 connects the energy storage device 335 to the LED module 345, for example, the energy storage device 335 may generate a LED current $I_{LED}$. For example, $I_{LED}$ may be generated passively based on resistive characteristics of the LED module and LED control circuit 330 as described later with reference to FIG. 3D.

In this example, the switch circuit 340 includes a control input port 350 configured to receive a control signal from the controller circuit 310. The controller circuit 310 will be discussed in more detail with reference to FIG. 3E.

As shown in FIG. 3D, the LED module 345 includes LEDs 355. For example, the LEDs 355 may be serially connected. When the switch circuit 340 connects the LED module 345 to the energy storage device 335, the LED module 345 may receive the LED current $I_{LED}$. Based on the magnitude of the $I_{LED}$, the LED module 345 may emit a light. For example, at a higher current, the LED module 345 may emit a higher intensity light. At a lower current (e.g., at a nominal current of the external power supply), for example, the LED module 345 may emit a dimmer light.

The LED current $I_{LED}$ is regulated by a LED current regulation circuit 360 in this example. As shown, the LED current regulation circuit 360 includes a first (NPN) transistor 362 (Q6), a second transistor 364 (Q10), and two parallel resistors R3 and R4. As shown, a collector terminal of the first transistor 362 is coupled to the LED module 345. A base terminal of the first transistor 362 is coupled to the energy storage device and switch circuit 325. Also, the base terminal of the first transistor 362 is coupled to a collector terminal of the second transistor 364. As shown, an emitter terminal of the first transistor 362 is coupled to a base terminal of the second transistor 364.

In some implementations, the first transistor 362 and the second transistor 364 may regulate the $I_{LED}$ at the high power mode. For example, in the high power mode, the LED current $I_{LED}$ may be regulated by a voltage between base and emitter of Q10 divided by an effective resistance of the parallel resistor R3 and R4. In some implementations, the LED current regulation circuit 360 may set maximum $I_{LED}$. For example, the maximum $I_{LED}$ may be less than the power supply voltage divided by the effective resistance of the parallel resistor R3 and R4. For example, the LED current regulation circuit 360 may advantageously protect the LED module 345 without external signal control. In some implementations, the LED current regulation circuit 360 may set a maximum $I_{LED}$ to be higher than the power supply voltage divided by the effective resistance of the parallel resistor R3 and R4.

In various implementations, the LED current regulation circuit 360 may passively and automatically switch an operating mode of the LED module 345 from the high-power mode to the steady-state mode based on a base-emitter voltage of the transistor Q6. For example, regulating the $I_{LED}$ in an analog circuit may advantageously improve a response speed of the LEDs. In some examples, the LED current regulation circuit 360 may advantageously reduce cost by implementation without using software and/or computer chips (which is in shortage).

As an illustrative example, when the switch circuit 340 connects the LED module 345 and the energy storage device 335. For example, $I_{LED}$ may flow out of the capacitor bank of the energy storage device 335 into the LEDs of the LED module 345. For example, the LEDs may be operated in the high-power mode because $I_{LED}>I_{NORM}$, a normal current of the power supply. For example, the LEDs may emit a high intensity for the MVM 120, for example.

In some implementations, as capacitors discharge, voltage of the capacitor drops, reducing the LED current $I_{LED}$. After some time (e.g., 20-30 ms), for example, the energy storage device 335 may be drained so that $I_{LED}$ is reduced to $I_{NORM}$. At this point, for example, the ESCC 320 may limit $I_{in}$ to match that of $I_{LED}$. In various implementations, the LED module 345 may advantageously be automatically and linearly switched to the steady-state mode to, for example, emit a dimmer light than in the high-power mode.

Figure 3E:
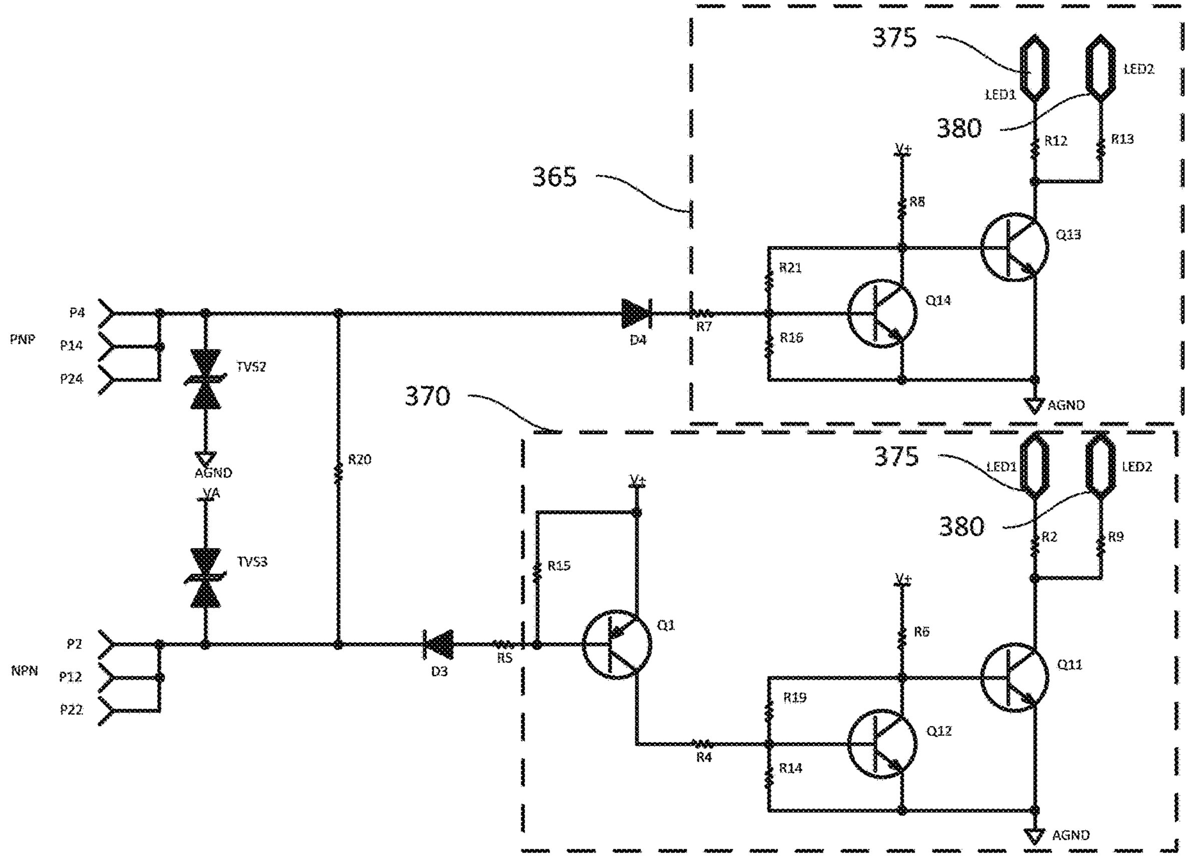

FIG. 3E shows the controller circuit 310 with reference to FIG. 3A. In this embodiment, the controller circuit 310 is an analog circuit. In other embodiments, the controller circuit 310 may be implemented as a digital controller. In this example, the controller circuit 310 includes an active high control 365 and an active low control 370. For example, the switch circuit 340 may be selectively connected to the active high control 365 or the active low control 370 based on signal configuration of an external control circuit.

Each of the active high control 365 and the active low control 370 includes a first control input 375 and a second control input 380. For example, the first control input 375 may be connected to the control input port 350 of the first light emitting circuit 305*a*. For example, the second control input 380 may be connected to the control input port 350 of the two light emitting circuits 305*b*. In this example, the first control input 375 and the second control input 380 are configured to be activated and to be deactivated simultaneously. In other examples, the first control input 375 and the second control input 380 may be configured to be activated at non-simultaneously and/or asynchronously.

Figure 4:
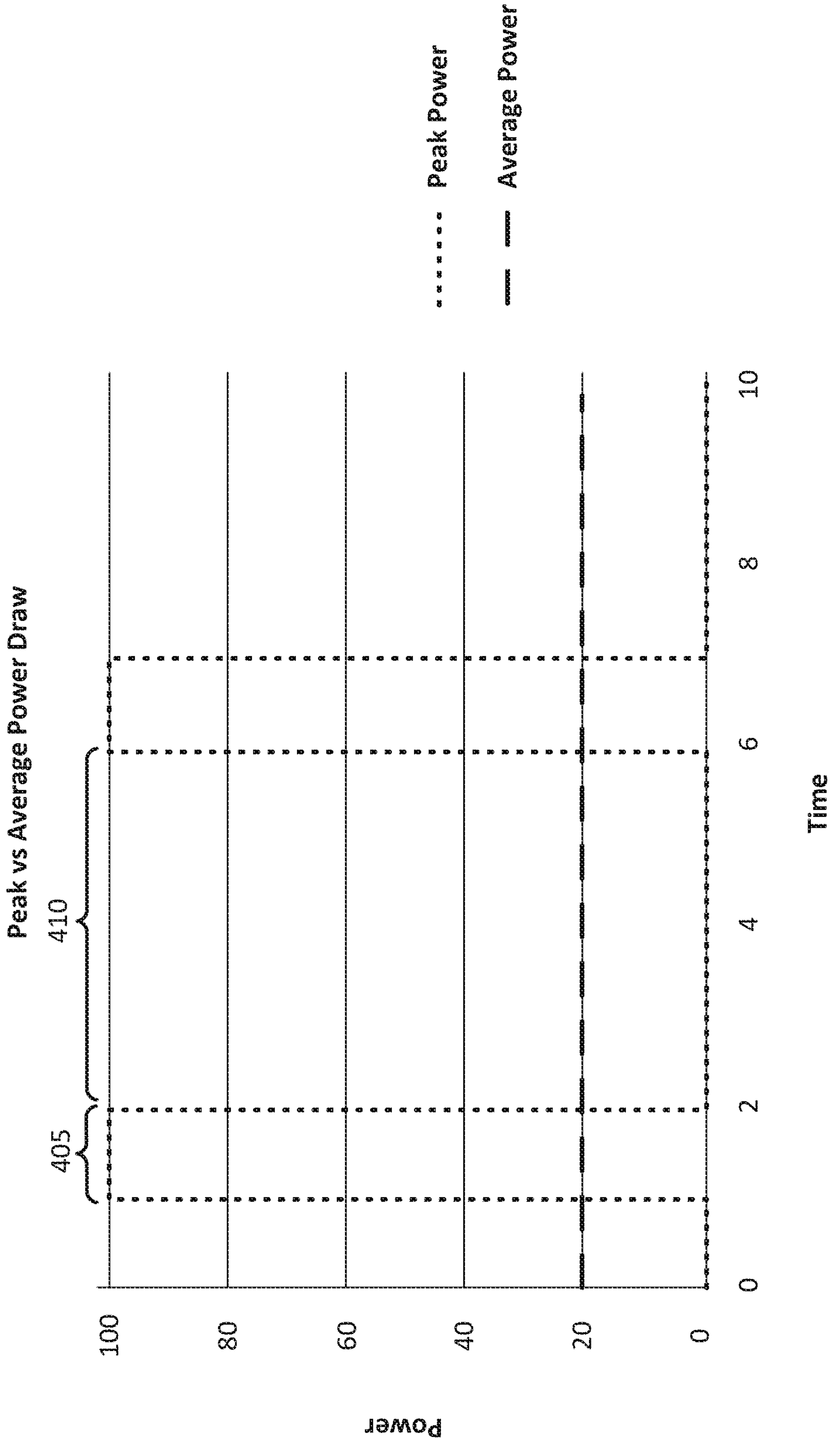
FIG. 4 depicts a diagram showing an exemplary power output from an SPLEDS.

FIG. 4 depicts a diagram showing an exemplary power output from an SPLEDS. As shown, a SPLEDS (e.g., the SPLEDS 200) may be operated with a duty cycle having a peak power cycle 405 and an average power cycle 410. For example, during the peak power cycle 405, the energy storage device 210 may be configured to discharge stored electric charge to the LED(s) 220, generating a high $I_{LED}$. For example, the LED(s) 220 may, in the high-power mode, emit a high intensity light for capturing sharp images and reduce motion blur in the images. During the average power cycle 410, for example, the LED(s) 220 may be disconnected by the switch 215. For example, the energy storage device 210 may draw current from an external power supply though the ESCC 205. For example, the energy storage device 210 may be recharged during this time with electric charges.

In some implementations, an SPLEDS (e.g., the SPLEDS 200) may be designed to have a max pulse width of 2.5 milliseconds (ms) and a duty cycle of under 7.5%. The 2.5 ms pulse width may, for example, be a maximum time that the SPLEDS 200 may operate before the LED current starts dropping. For example, the LED current may start dropping when the capacitors run out of charge. In some embodiments, when an application includes a duty cycle<7.5%, there may be enough time to recharge the capacitors during the off period independent of the duty cycle frequency.

Figure 5A:
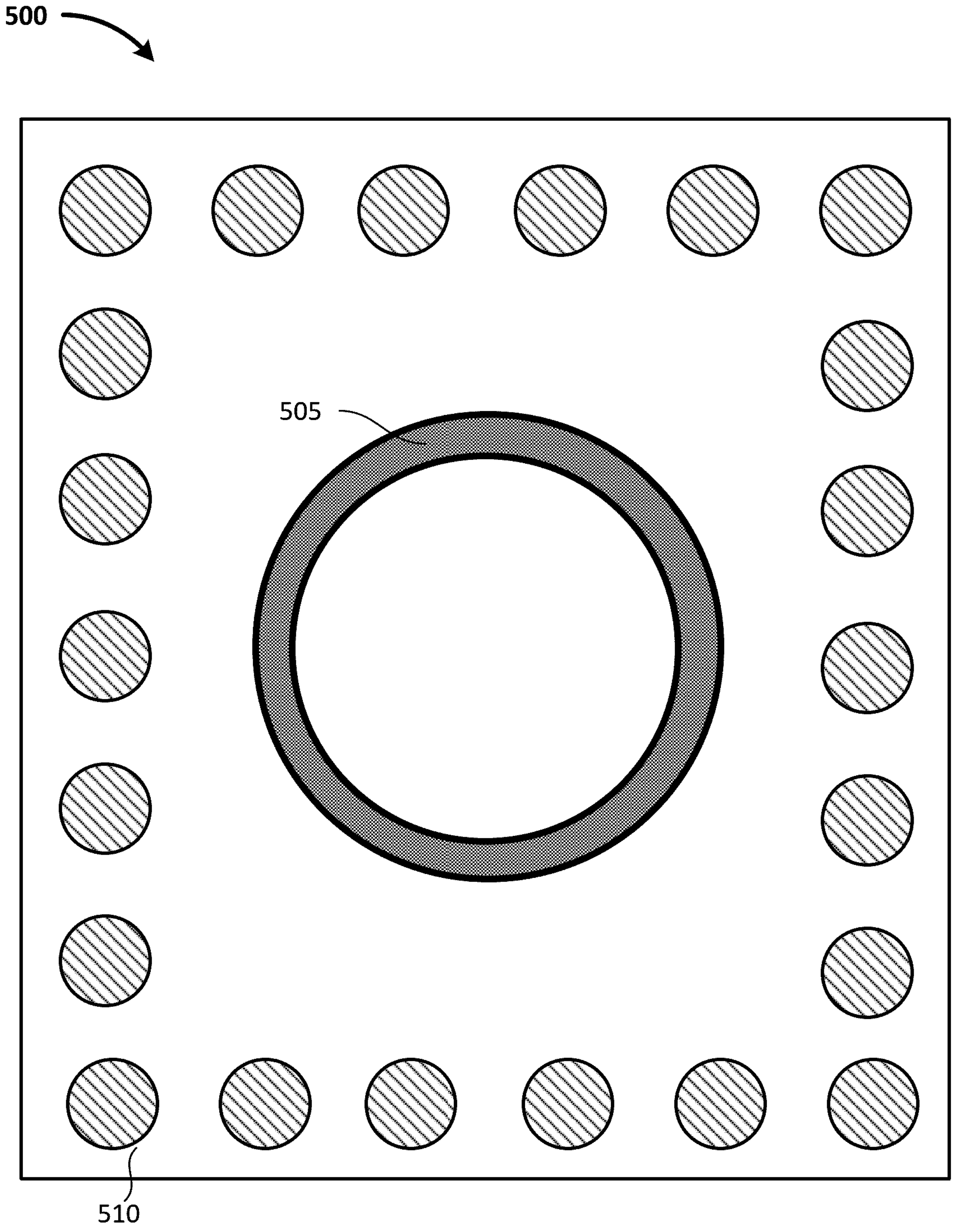
FIG. 5A and FIG. 5B depict an illustrative SPLEDS in a first exemplary form factor.
Figure 5B:
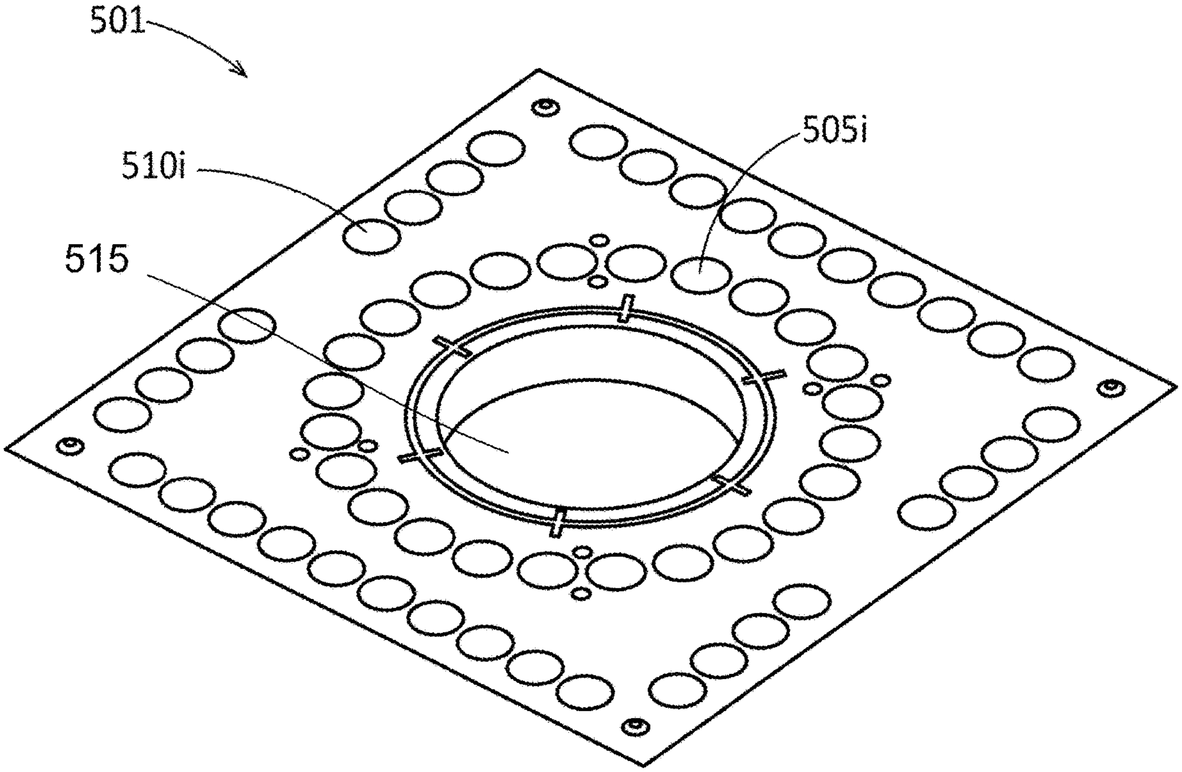

FIG. 5A and FIG. 5B depict an illustrative SPLEDS in a first exemplary form factor. As shown in FIG. 5A, a SPLEDS 500 includes an LED ring 505 and capacitor units 510. In some embodiments, the capacitor units 510 may be configured to store a large amount of power. For example, the capacitor units 510 may be (e.g., serially) connected by wide strips of copper traces to advantageously reduce resistance.

As shown, the capacitor units 510 are placed around a peripheral of the LED ring 505. In some implementations, the capacitor units 510 may be placed at a maximum distance between each of the capacitor units 510 to advantageously reduce heat accumulated in the capacitor units 510 in operation. In some implementations, the capacitor units 510 may be disposed at a maximum distance away from the LED ring 505 to avoid thermally affecting electronic components of the LED ring 505.

As shown in FIG. 5B, a SPLEDS 501 is configured as disclosed at least with reference to FIG. 5A. Light emitting elements 505*i* (e.g., LEDs) are disposed in a first pattern (e.g., corresponding to the LED ring 505). Current boost elements 510*i* (e.g., energy storage elements, such as capacitors as shown) are disposed in a second pattern. As shown, the second pattern is spatially distributed outside of the first pattern. For example, the first pattern may be configured to concentrate emitted light near a center aperture 515 (e.g., where an optical detector may be placed). The second pattern may be configured to thermally distribute heat sources (e.g., the current boost elements 510*i*) away from the center aperture 515. The second pattern may, for example, be configured to thermally distribute heat sources away from each other. The second pattern may, for example, be configured to thermally distribute heat sources across a minimum area and/or volume.

Figure 5C:
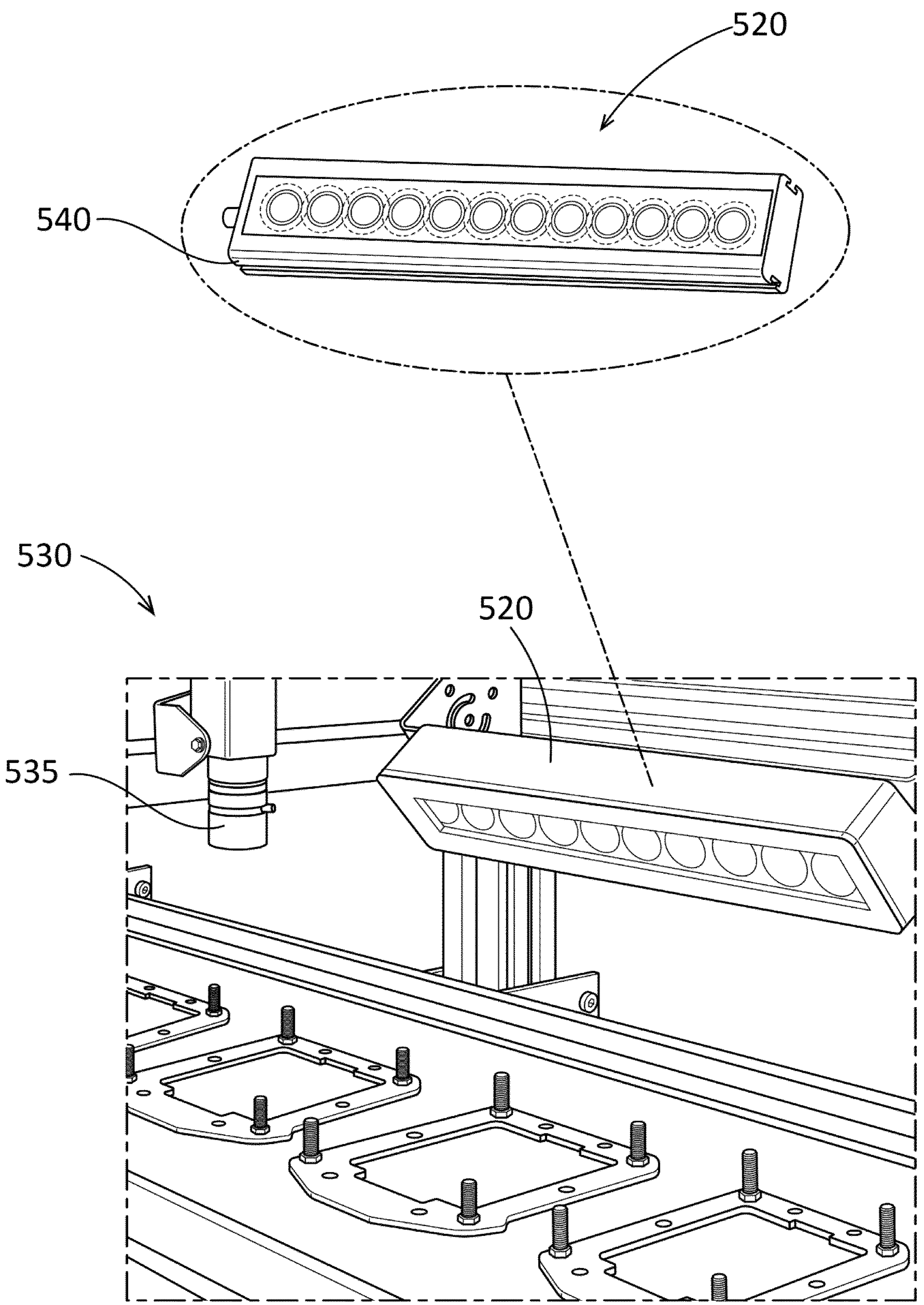
FIG. 5C depicts an illustrative SPLEDS in a second exemplary form factor.

The SPLEDS 501 may, for example, be radially symmetric (e.g., when viewed from the front as shown in FIG. 5B, when viewed from the rear, such as partially shown in FIG. 5C). In some implementations, a connector(s) (e.g., cable connector, plug, wiring access aperture) may be provided on an edge and/or surface.

FIG. 5C depicts an illustrative SPLEDS in a second exemplary form factor. As shown a linear LED module 520 is used in a conveyor belt 530. For example, the linear LED module 520 may be configured to provide a pulsed light for high resolution image capturing for a camera 535. As shown, the linear LED module 520 includes a capacitor unit 540 around an outer peripheral of the linear LED module 520 to advantageously prevent heat being accumulated within the linear LED module 520.

Figure 6:
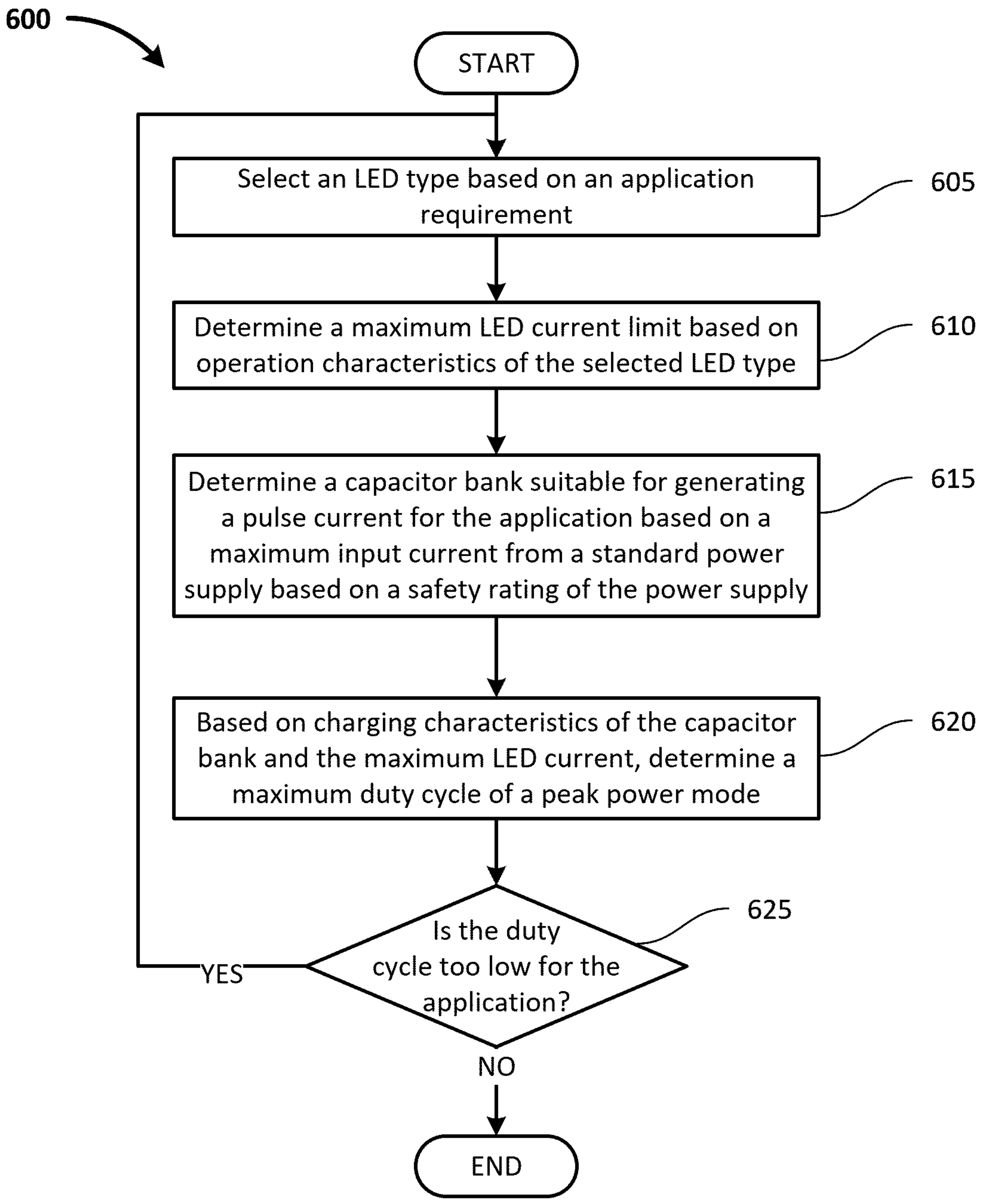
FIG. 6 is a flowchart illustrating an exemplary SPLEDS design method.

FIG. 6 is a flowchart illustrating an exemplary SPLEDS design method. A method 600, for example, may be performed by an engineer to design the SPLEDS 200 for a machine vision application (e.g., the ALMVS 100). In this example, the method 600 begins when an LED type is selected based on an application requirement in step 605. For example, the engineer may select the LED type based on a light output requirement for the application (e.g., the camera for the pick and transfer application described in FIG. 1). In some implementations, the light output requirement may be specified in lumens per meter square.

In step 610, a maximum LED current limit is determined based on operation characteristics of the selected LED type. For example, the maximum LED current limit may be determined to protect LEDs during the high-power mode. For example, based on the maximum LED current limit, the engineer may determine the LED current regulation circuit 360. Next, a capacitor bank suitable for generating a pulse current for the application is determined based on a maximum input current from a standard power supply based on a safety rating of the power supply in step 615. For example, the maximum input current may be determined based on a safety rating of a class 1 power supply. In some implementations, simulations may be used to determine a total energy storage required. For example, the simulations may determine and verify a topology and size of the capacitors in the capacitor bank. For example, the simulation may verify charging characteristics of the capacitor bank based on operation characteristics of the capacitors.

Based on charging characteristics of the capacitor bank and the maximum LED current, in step 620, a maximum duty cycle of a peak power mode is determined. For example, a minimum recharging time per duty cycle may be determined. In a decision point 625, it is determined whether the duty cycle is too low for the application. For example, the application may require a 10% duty cycle for the MVM 120 to operate. If the duty cycle is too low for the application, the step 605 is repeated. For example, if there is a need to have a higher duty cycle of time that the LED is on in order to increase brightness, then a design process (e.g., the method 600) may need to be start all over again. If the duty cycle is not too low for the application, the method 600 ends. In various embodiments, the SPLEDS may be designed to automatically protect the LED module and the external power supply without sensor elements to control a duty cycle of the energy storage device.

Figure 7:
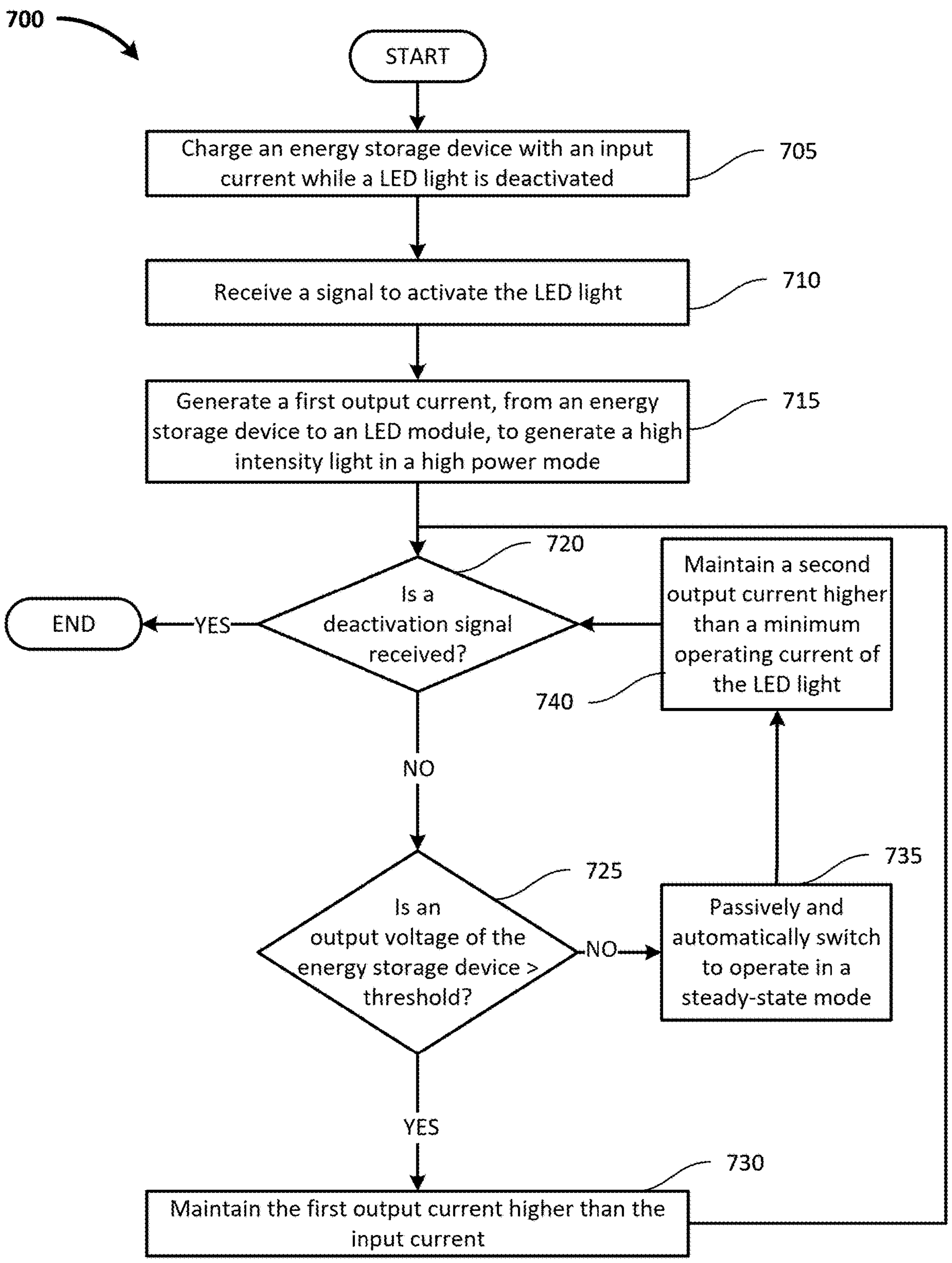
FIG. 7 is a flowchart illustrating an exemplary SPLEDS operation method.

FIG. 7 is a flowchart illustrating an exemplary SPLEDS operation method. For example, the SPLEDS 200 may perform the method 700 to supply high intensity light to support the MVM 120 for machine vision processing. In some examples, the ALMVS 100 may use the method 700 to generate a pulse light for a predetermined time (e.g., the peak power cycle 405) while maintaining a dimmer ambient light after the energy in the current boost module 145 is depleted (e.g., in the average power cycle 410).

In this example, the method 700 begins in step 705 when an energy storage device is charged with an input current (e.g., a battery, a direct current power supply, an uninterrupted power supply) while a LED light is deactivated. For example, the energy storage device 210 may be charged continuously by the ESCC 205 when the LED(s) 220 is deactivated by the switch 215. For example, the input power may be regulated by ESCC 205 to be less than or equal to a power rating of an external power supply (e.g., a class 1 power supply).

In step 710, a signal is received to activate the LED light. For example, the switch 215 may receive a signal to activate the SPLEDS 200. Next, in step 715, a first output current is generated, from the energy storage device to the LED module, to generate a high intensity light in a high-power mode. For example, the first output current may be regulated by the LED control circuit 230 to be less than the predetermined peak pulse current 235 of the LED(s) 220. For example, the energy storage device 210 may supply an output power to the LED(s) 220 to generate the high intensity light. For example, the MPCLC 250 may regulate the current at the LED(s) 220 in the high-power mode to be less than the predetermined peak pulse current 235. For example, the analog response characteristics of the transistors Q6 and Q10 of the SPLEDS 300 may permit a larger current draw than the maximum current allowed by the MICLC 245.

Next, in a decision point 720, it is determined whether a deactivation signal is received. For example, the deactivation signal may be received from the switch 215 from the remote controller 160. If the deactivation signal is received, the method 700 ends. If the deactivation signal is not received, it is determined whether an output voltage of the energy storage device is above a predetermined threshold in a decision point 725. For example, the predetermined threshold may be determined by the LED control circuit 230. In some implementations, the method 700 may determine remaining energy stored in the energy storage device 210 using other indicators. For example, the LED control circuit 230 may be configured to detect the remaining energy in the energy storage device 210 using a current measurement. For example, the LED control circuit 230 may be configured to detect the remaining energy in the energy storage device 210 using an output power measurement.

If it is determined that the output voltage of the energy storage device is above the predetermined threshold, in step 730, the first output current is maintained to be higher than the input current (from an external power supply), and the decision point 720 is repeated. For example, the LED control circuit 230 may maintain the power at the LED(s) 220 when an input voltage at the energy storage device 210 varies slightly. For example, the LED control circuit 230 may maintain the power at the LED(s) 220 in the peak power cycle 405 to generate a high intensity light. If it is determined that the output voltage of the energy storage device is not above the predetermined threshold, an operation of the LED light is passively and automatically switched to a steady-state mode in step 735, and the step 715 is repeated. For example, when the charges stored in the energy storage device 335 are depleted, the LED current regulation circuit 360 may passively and automatically transition from the high-power mode to the steady state mode. For example, using the analog response characteristics of the transistors Q2 and Q4 of the SPLEDS 300, the MICLC 245 may regulate the input current to be higher than the predetermined minimum operable current 240 in the steady-state mode.

In the steady-state mode, in step 740, a second output current higher than a minimum operating current of the LED light is maintained. For example, the LED control circuit 230 may maintain a LED current higher than the predetermined minimum operable current 240 to flow to the LED(s) 220. For example, the LED(s) 220 may be operated with a dimmer intensity in the steady-state mode.

Although various embodiments have been described with reference to the figures, other embodiments are possible. In some implementations, the LED module 125 may include other form factors. For example, the LED module 125 may be implemented as a linear LED (e.g., the linear LED module 520). For example, the linear LED may include LEDs in a linear housing. For example, the linear LED may include an LED bar. For example, the linear LED may include a linear LED device. In some implementations, the LED module 125 may be an area light. For example, the area light may be configured to illuminate an area with a high intensity light in the high-power mode. For example, the LED module 125 may be implemented as a rectangular LED plate. In some implementations, for example, the LED module 125 may be implemented as a linear LED bar.

In some implementations, the energy storage device 210 may include batteries. For example, the energy storage device 210 may include lead-acid batteries. For example, the energy storage device 210 may include batteries rated to have a maximum amperage draw greater than an input current associated with a predetermined power input threshold. For example, the energy storage device 210 may include lithium-ion batteries.

Although one circuit implementation is described with reference to FIGS. 3A-E, in some implementations, other circuit configuration may be possible. For example, other circuits may be used to provide an overcurrent protection for a power supply. For example, other circuits may be used to provide an energy storage for the high-power mode. For example, other circuits may be used to set a LED current limit for the LED module.

Although an exemplary system has been described with reference to FIG. 1-2, other implementations may be deployed in other industrial, scientific, medical, commercial, and/or residential applications. For example, the SPLEDS 200 may be used as a flash device for a camera. The camera may be used in, for example, studio photo and/or other professional photo sessions (e.g., for fashion, advertising). In some implementations, the SPLEDS 200 may be used for entertainment lighting in various hospitality services (e.g., restaurants, night clubs, theaters, concert halls, amusement parks). In some implementations, the SPLEDS 200 may be used as outdoor flash indicators. For example, the SPLEDS 200 may be used as a flash indicator of a mobile equipment. For example, the SPLEDS 200 may be used as a flash indicator of an airport runway. In some implementations, the SPLEDS 200 may be used in various medical applications for obtaining high quality images in various types of medical biopsy.

In various implementations, the SPLEDS 200 may be implemented to be used with other passive electric loads. For example, instead of the LED(s) 220, the SPLEDS 200 may be used with flash output beacon indicators. For example, the SPLEDS 200 may provide a pulsed high current for the flash output beacon indicators to generate a flash output for a predetermined duty cycle (e.g., like the peak power cycle 405). For example, the SPLEDS 200 may be used for powering runway lights.

In some examples, the SPLEDS 200 may include military or enforcement applications. For example, military or enforcement personnel may use the SPLEDS 200 to power a stun light to temporarily disarm an opposing personnel. For example, the SPLEDS 200 may advantageously reduce a weight (e.g., from carrying a high power rating power supply) required to power the stun light. Thereby, the SPLEDS 200 may reduce fatigue and increase mobility of the personnel.

Temporary auxiliary energy inputs may be received, for example, from chargeable or single use batteries, which may enable use in portable or remote applications. Some embodiments may operate with other DC voltage sources, such as 9V (nominal) batteries, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Although particular features of an architecture have been described, other features may be incorporated to improve performance. For example, caching (e.g., L1, L2, . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades), and the like. One or more communication interfaces may be provided in support of data storage and related operations.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device. The display device may, for example, include an LED (light-emitting diode) display. In some implementations, a display device may, for example, include a CRT (cathode ray tube). In some implementations, a display device may include, for example, an LCD (liquid crystal display). A display device (e.g., monitor) may, for example, be used for displaying information to the user. Some implementations may, for example, include a keyboard and/or pointing device (e.g., mouse, trackpad, trackball, joystick), such as by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/ or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IOT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an illustrative aspect, a dual stage power regulation circuit may include a current regulation circuit connected to a power supply may include a predetermined input power threshold. For example, the dual stage power regulation circuit may include an energy storage device serially connected to the current regulation circuit. For example, the energy storage device may be configured to store energy received from the current regulation circuit.

For example, the dual stage power regulation circuit may include a switch circuit configured to selectively connect a passive electric load to the energy storage device. For example, the switch circuit may be configured to receive an activation signal to cause the passive electric load to serially connect to the energy storage device. For example, the dual stage power regulation circuit may include an output regulation circuit serially connected to the passive electric load. For example, the output regulation circuit may include a first transistor and a second transistor.

For example, a collector terminal of the first transistor may be coupled to the passive electric load. For example, a base terminal of the first transistor may be coupled to (1) the energy storage device via the switch circuit and (2) a collector terminal of the second transistor. For example, an emitter terminal of the first transistor may be coupled to a base terminal of the second transistor, such that the output regulation circuit may be configured to regulate a current output of the energy storage device flowing through the passive electric load. For example, in response to receiving the activation signal, the passive electric load receives the output power from the energy storage device in two stages.

For example, in a first stage, the output power may be greater than the predetermined input power threshold. For example, when the energy stored in the energy storage device may be less than a predetermined energy threshold, the output regulation circuit may be configured to passively and automatically transition the first stage to a second stage. For example, in the second stage, the energy storage device supplies the output power less than or equal to the predetermined input power threshold while the output regulation circuit regulates a current of the output power above a predetermined minimum operating current of the passive electric load.

For example, the passive electric load may include a light emitting diode (LED) module may include a plurality of serially connected LEDs. For example, the predetermined minimum operating current may include a minimum operating current of the plurality of serially connected LEDs. For example, in the first stage, the LED module may be configured to emit a pulse light. For example, in the second stage, the LED module may be configured to emit a steady light dimmer than the pulse light emitted in the first stage.

For example, the current regulation circuit connected may be further configured to regulate an output current of the power supply to be less than a predetermined input current threshold. For example, the energy storage device may include a plurality of capacitors connected in parallel. For example, a maximum duration and frequency of the first stage may be determined as a function of an effective capacitance of the energy storage device.

For example, the output regulation circuit may be further configured to regulate the output power to be less than a predetermined output power threshold determined based on a power rating of the passive electric load. For example, the predetermined output power threshold may be greater than the predetermined input power threshold. For example, the predetermined output power output threshold may be a predetermined multiple of the predetermined input power threshold.

For example, in the first stage, the output regulation circuit may be configured to maintain a steady current of the output power at the predetermined multiple of the current of the output power in the second stage.

In an illustrative aspect, an electric driver circuit may include an energy storage device (210) operably coupled to a power supply may include a predetermined input power threshold, the energy storage device being configured to store energy received from the power supply. For example, an electric driver circuit may include an output regulation circuit configured to regulate a current output of the energy storage device. For example, the energy storage device may be configured to connect and supply an output power to a passive electric load may include a predetermined minimum operating current. For example, in operation, the passive electric load receives the output power from the energy storage device in two stages.

For example, in a first stage, the output power may be greater than the predetermined input power threshold. For example, when the energy stored in the energy storage device may be less than a predetermined energy threshold, the output regulation circuit may be configured to passively and automatically transition the first stage to a second stage. For example, in the second stage, the energy storage device supplies the output power less than or equal to the predetermined input power threshold while the output regulation circuit regulates a current of the output power above the predetermined minimum operating current of the passive electric load.

For example, the passive electric load may include a light emitting diode (LED) module may include a plurality of serially connected LEDs. For example, the predetermined minimum operating current may include a minimum operating current of the plurality of serially connected LEDs.

For example, in the first stage, the LED module may be configured to emit a pulse light. For example, in the second stage, the LED module may be configured to emit a steady light dimmer than the pulse light emitted in the first stage.

For example, an electric driver circuit may include an energy storage charge circuit (ESCC). For example, the energy storage device may be connected to the power supply through the ESCC. For example, the ESCC may be configured to regulate an output current of the power supply to be less than a predetermined input current threshold.

For example, the energy storage device may include a plurality of capacitors connected in parallel. For example, a maximum duration and frequency of the first stage may be determined as a function of an effective capacitance of the energy storage device. For example, the output regulation circuit may be configured to regulate the output power to be less than a predetermined output power threshold determined based on a power rating of the passive electric load. For example, the predetermined output power threshold may be greater than the predetermined input power threshold of the power supply.

For example, the predetermined output power threshold may be a predetermined multiple of the predetermined input power threshold. For example, in the first stage, the output regulation circuit may be configured to maintain a steady current of the output power at the predetermined multiple of the current of the output power in the second stage.

For example, an electric driver circuit may include a switch circuit configured to activate and deactivate the passive electric load independent of the operating stage of the passive electric load.

In an illustrative aspect, a method for supplying a pulse light may include charging an energy storage device with an input current. For example, the input current may be regulated to be less than a predetermined safety threshold.

The method for supplying a pulse light may include receiving a signal to activate a LED module may include a predetermined minimum operating current. method for supplying a pulse light may include generating, in a first mode, a first output current to the LED module, to generate a pulse light. For example, the first output current substantially greater than the input current method for supplying a pulse light may include switching, passively and automatically, to operate in a second mode when an output voltage of the energy storage device may be below a predetermined threshold. For example, in the second mode, the LED module may be supplied with a second output current lower than the first output current, but higher than the predetermined minimum operating current, such that the LED module emits a light with a reduced intensity.

For example, the first output current may include a current of a predetermined multiple of the predetermined safety threshold. For example, the first output current may be maintained at a steady state in the first mode.

For example, the dual stage power regulation circuit of any of [0102-0119] may be combined with any of the electric driver circuit of any of [0110-117]. For example, the dual stage power regulation circuit of any of [0102-0119] may be combined with any of the method for supplying a pulse light of any of [0118-0120].

For example, the electric driver circuit of any of [0110-0117] may be combined with any of the method for supplying a pulse light of any of [0118-0120]. For example, the electric driver circuit of any of [0110-0117] may be combined with any of the dual stage power regulation circuit of [0102-0119].

For example, the method for supplying a pulse light of any of [0118-0120] may be combined with any of the electric driver circuit of any of [0110-117]. For example, the method for supplying a pulse light of any of [0118-0120] may be combined with any of the dual stage power regulation circuit of any of [0102-0119].

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A dual stage power regulation circuit comprising:

a current regulation circuit (205) connected to a power supply comprising a predetermined input power threshold;

an energy storage device (210) serially connected to the current regulation circuit, wherein the energy storage device is configured to store energy received from the current regulation circuit;

a switch circuit (215) configured to selectively connect a passive electric load (220) to the energy storage device, wherein the switch circuit is configured to receive an activation signal to cause the passive electric load to serially connect to the energy storage device; and, an output regulation circuit (230) serially connected to the passive electric load, wherein the output regulation circuit comprises a first transistor (362) and a second transistor (364), wherein:

a collector terminal of the first transistor is coupled to the passive electric load, a base terminal of the first transistor is coupled to (1) the energy storage device via the switch circuit and (2) a collector terminal of the second transistor, and, an emitter terminal of the first transistor is coupled to a base terminal of the second transistor, such that the output regulation circuit is configured to regulate a current output of the energy storage device flowing through the passive electric load, wherein, in response to receiving the activation signal, the passive electric load receives the output power from the energy storage device in two stages, wherein:

in a first stage, the output power is greater than the predetermined input power threshold, and, when the energy stored in the energy storage device is less than a predetermined energy threshold, the output regulation circuit is configured to passively and automatically transition the first stage to a second stage, wherein, in the second stage, the energy storage device supplies the output power less than or equal to the predetermined input power threshold while the output regulation circuit regulates a current of the output power above a predetermined minimum operating current (240) of the passive electric load.

2. The dual stage power regulation circuit of claim 1, wherein the passive electric load comprises a light emitting diode (LED) module comprising a plurality of serially connected LEDs, wherein the predetermined minimum operating current comprises a minimum operating current of the plurality of serially connected LEDs, wherein:

in the first stage, the LED module is configured to emit a pulse light, and, in the second stage, the LED module is configured to emit a steady light dimmer than the pulse light emitted in the first stage.

3. The dual stage power regulation circuit of claim 1, wherein the current regulation circuit connected is further configured to regulate an output current of the power supply to be less than a predetermined input current threshold.

4. The dual stage power regulation circuit of claim 1, wherein the energy storage device comprises a plurality of capacitors connected in parallel.

5. The dual stage power regulation circuit of claim 4, wherein a maximum duration and frequency of the first stage is determined as a function of an effective capacitance of the energy storage device.

6. The dual stage power regulation circuit of claim 1, wherein the output regulation circuit is further configured to regulate the output power to be less than a predetermined output power threshold determined based on a power rating of the passive electric load, wherein the predetermined output power threshold is greater than the predetermined input power threshold.

7. The dual stage power regulation circuit of claim 6, wherein the predetermined output power output threshold is a predetermined multiple of the predetermined input power threshold.

8. The dual stage power regulation circuit of claim 7, wherein, in the first stage, the output regulation circuit is configured to maintain a steady current of the output power at the predetermined multiple of the current of the output power in the second stage.

9. An electric driver circuit comprising:

an energy storage device (210) operably coupled to a power supply (135) comprising a predetermined input power threshold, the energy storage device being configured to store energy received from the power supply; and, an output regulation circuit (230) configured to regulate a current output of the energy storage device, wherein the energy storage device is configured to connect and supply an output power to a passive electric load (220) comprising a predetermined minimum operating current (240) and, wherein, in operation, the passive electric load receives the output power from the energy storage device in two stages, wherein:

in a first stage, the output power is greater than the predetermined input power threshold, and, when the energy stored in the energy storage device is less than a predetermined energy threshold, the output regulation circuit is configured to passively and automatically transition the first stage to a second stage, wherein, in the second stage, the energy storage device supplies the output power less than or equal to the predetermined input power threshold while the output regulation circuit regulates a current of the output power above the predetermined minimum operating current of the passive electric load.

10. The electric driver circuit of claim 9, wherein the passive electric load comprises a light emitting diode (LED) module comprising a plurality of serially connected LEDs, wherein the predetermined minimum operating current comprises a minimum operating current of the plurality of serially connected LEDs, wherein:

in the first stage, the LED module is configured to emit a pulse light, and, in the second stage, the LED module is configured to emit a steady light dimmer than the pulse light emitted in the first stage.

11. The electric driver circuit of claim 9, further comprising an energy storage charge circuit (ESCC), wherein the energy storage device is connected to the power supply through the ESCC, wherein the ESCC is configured to regulate an output current of the power supply to be less than a predetermined input current threshold.

12. The electric driver circuit of claim 9, wherein the energy storage device comprises a plurality of capacitors connected in parallel.

13. The electric driver circuit of claim 12, wherein a maximum duration and frequency of the first stage is determined as a function of an effective capacitance of the energy storage device.

14. The electric driver circuit of claim 9, wherein the output regulation circuit is configured to regulate the output power to be less than a predetermined output power threshold determined based on a power rating of the passive electric load, wherein the predetermined output power threshold is greater than the predetermined input power threshold of the power supply.

15. The electric driver circuit of claim 14, wherein the predetermined output power threshold is a predetermined multiple of the predetermined input power threshold.

16. The electric driver circuit of claim 15, wherein, in the first stage, the output regulation circuit is configured to maintain a steady current of the output power at the predetermined multiple of the current of the output power in the second stage.

17. The electric driver circuit of claim 9, further comprising a switch circuit configured to activate and deactivate the passive electric load independent of the operating stage of the passive electric load.

18. A method for supplying a pulse light, comprising:

charge an energy storage device with an input current, wherein the input current is regulated to be less than a predetermined safety threshold (705);

receive a signal to activate a LED module comprising a predetermined minimum operating current (710);

generate, in a first mode, a first output current to the LED module, to generate a pulse light, wherein the first output current substantially greater than the input current (715); and, switch, passively and automatically, to operate in a second mode when an output voltage of the energy storage device is below a predetermined threshold (735), such that, in the second mode, the LED module is supplied with a second output current lower than the first output current, but higher than the predetermined minimum operating current, such that the LED module emits a light with a reduced intensity.

19. The method for supplying a pulse light of claim 18, wherein the first output current comprises a current of a predetermined multiple of the predetermined safety threshold.

20. The method for supplying a pulse light of claim 18, wherein the first output current is maintained at a steady state in the first mode.

* * * * *